May 4, 1965     H. MOORE ETAL     3,181,185

METHOD OF MAKING FRICTIONAL LOCKING SETSCREWS

Filed June 20, 1963

INVENTORS
HARRINGTON MOORE
ALBERT G. ENGEL
BY *Moore & Altman*

ATTORNEYS 3,181,185
METHOD OF MAKING FRICTIONAL LOCKING SETSCREWS
Harrington Moore, East Acton, and Albert G. Engel, Medford, Mass., assignors to George W. Moore, Inc., Waltham, Mass., a corporation of Massachusetts
Filed June 20, 1963, Ser. No. 291,227
2 Claims. (Cl. 10—10)

This invention relates to headless setscrews having slightly deformed threads which act to lock the screw against accidental loosening after it has been screwed into a threaded hole, and to an economical method of making such a setscrew.

An object of the invention is to produce screws having a thread with an edge arranged to bite into a flank of the internal thread in the hole into which the screw is to be driven.

Another object of the invention is to make such screws quickly and cheaply by a novel sequence of steps which are hereinafter described and are illustrated on the drawing, of which FIGURE 1 is a fragmentary elevational view of a screw-threaded rod of indefinite length;

Figure 1:
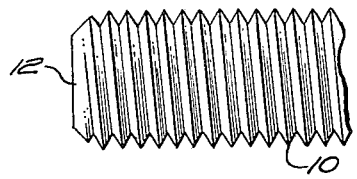
Figure 2:
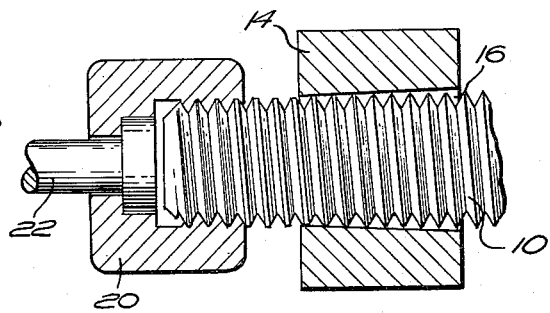
FIGURE 2 is a fragmentary elevational view of the rod being drawn through a die which is shown in section.
Figure 3:
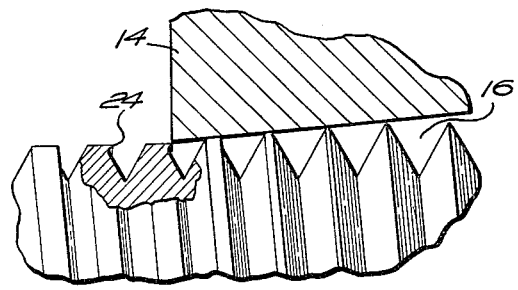
FIGURE 3 is a fragmentary portion of the rod and die shown in FIGURE 2, on a larger scale.
Figure 4:
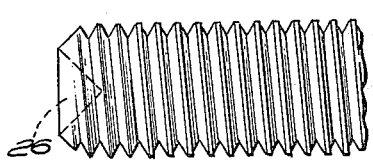
FIGURE 4 is a fragmentary elevation of the rod after the crests of some of the end turns of the thread have been shaved and a conical cup has been made in the end of the rod.
Figure 5:
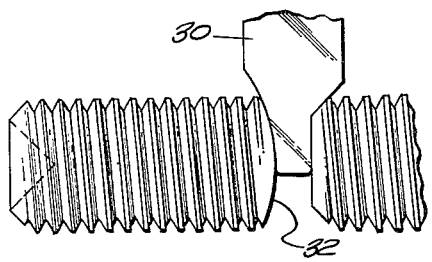
FIGURE 5 illustrates the step of cutting off a screw from the rod and cutting a bevel on the fresh end of the threaded rod.
Figure 6:
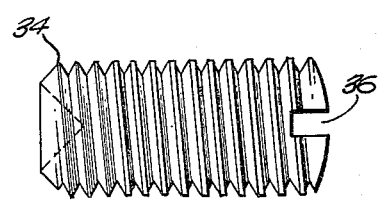
FIGURE 6 is an elevation of the finished screw.

The leading end portion of a screw-threaded rod 10 of indefinite length is illustrated in FIGURE 1, the rod presumably being long enough to be cut up into a considerable number of individual screws. Initially, the end of the rod will have to be beveled as at 12 for the first screw to be cut therefrom, but succeeding screws will have their work-engaging end beveled in the process of cutting off the preceding screw, as indicated in FIGURE 5.

The first operation on the rod as a whole is to draw it through a die 14 consisting of a thick steel block with a circular hole 16 therethrough which tapers in diameter from a diameter slightly greater than the crest diameter of the threaded rod 10 to a diameter slightly less than the crest diameter of the rod. To start the operation the first turns of the thread are shaved sufficiently to permit the leading portion of the rod to be pushed through the hole 16 until a few turns of thread project from the exit face of the die. An internally threaded cup 20 is screwed onto the projecting turns, the cup being connected to a pulling apparatus by a suitable draw bar 22. The rod 10 is then pulled through the hole 16. The taper in the hole 16 peens the successive turns of thread so that the crests bend away from the leading end of the rod and form a continuous feather 24 which extends helically the entire length of the rod except for the initial shaved turns. A conical cup or recess 26 is then made in the leading or work-engaging end of the rod to form the customary cupped end of a common form of setscrew. The first screw is then ready to be severed from the rod. This may be done by a suitable tool 30 which preferably not only cuts and shapes the trailing or driving end 32 of the screw but also bevels or otherwise shapes the leading end of the screw to follow. This leading end is cupped and one or more of the first few thread turns are shaved as at 34 to remove the feather 24 from those turns so that the screw can be introduced into a threaded hole without difficulty. The screw is then cut off as hereinbefore described, and a slot 36, socket, or other tool-receiving recess is formed in the trailing end of the screw.

The screw is then ready to be driven into a threaded hole. When the turn or turns of thread with the shaved crests have entered such a hole, the feather follows them and cuts into the flank of the interior thread in the hole. This results in a frictional locking effect which prevents accidental loosening of the screw.

We claim:
1. The method of making frictionally locking setscrews which comprises forming a screw thread on a rod of indefinite length, shaving the crests of a few turns of thread at one end of the rod, pushing said end through a die block with a circular hole tapering from a diameter slightly greater than the crest diameter of the rod to a diameter slightly less than the crest diameter of the rod, gripping said shaved end, drawing said rod through the die block whereby the crests of the turns of thread are peened over to form a continuous feather along the crest of the thread, cutting off successive pieces of said rod and simultaneously beveling the leading end of the next piece to be cut off, shaving the crest of end turns of thread at the beveled end of each said piece, and forming a tool-receiving recess in the other end of each piece after it has been cut off.

2. The method described in claim 1, the shaving operation on each setscrew being performed before the setscrew is severed from the remainder of the rod.

References Cited by the Examiner
UNITED STATES PATENTS

| | | | |
|---|---|---|---|
| 2,056,053 | 9/36 | Moore | 10—10 |
| 2,348,591 | 5/44 | Bailey | 90—86 |
| 3,076,208 | 2/63 | Moore | 10—10 |
| 3,134,115 | 5/64 | Moore et al. | 10—10 |

ANDREW R. JUHASZ, *Primary Examiner.*
WILLIAM W. DYER, JR., *Examiner.*